United States Patent [19]

Ostendorf

[11] 4,057,899

[45] Nov. 15, 1977

[54] STAKED BEARING CUTTER

[75] Inventor: Edward M. Ostendorf, St. Charles, Mo.

[73] Assignee: The United States of America as represented by the Secretary of the Air Force, Washington, D.C.

[21] Appl. No.: 756,940

[22] Filed: Jan. 5, 1977

[51] Int. Cl.$^2$ .......................... B26B 27/00; B26F 1/38
[52] U.S. Cl. ................................... 30/296 R; 30/300; 30/361
[58] Field of Search ................. 30/296 R, 360, 361, 30/303, 299, 300

[56] References Cited

U.S. PATENT DOCUMENTS

| | | | |
|---|---|---|---|
| 1,823,218 | 9/1931 | Swanson | 30/300 |
| 1,971,701 | 7/1934 | Bills | 30/360 |
| 3,269,011 | 7/1966 | Herrstrum | 30/360 |
| 3,348,310 | 10/1967 | Gottauf | 30/360 |

Primary Examiner—Al Lawrence Smith
Assistant Examiner—Nicholas P. Godici
Attorney, Agent, or Firm—Joseph E. Rusz; Arsen Tashjian

[57] ABSTRACT

A manually operated tool for relieving material on a 360° staked aircraft bearing by performing an accurate concentric cut at a controlled feed rate with a nominal cutting force. Three equally spaced cutting blades stabilize the cutter assembly while an integral timing and blade calibration component also serves as a retention collar. The staked grooves of the bearing race provide for concentric positioning of the cutter instead of the bore of the bearing thereby preventing possible damages.

3 Claims, 1 Drawing Figure

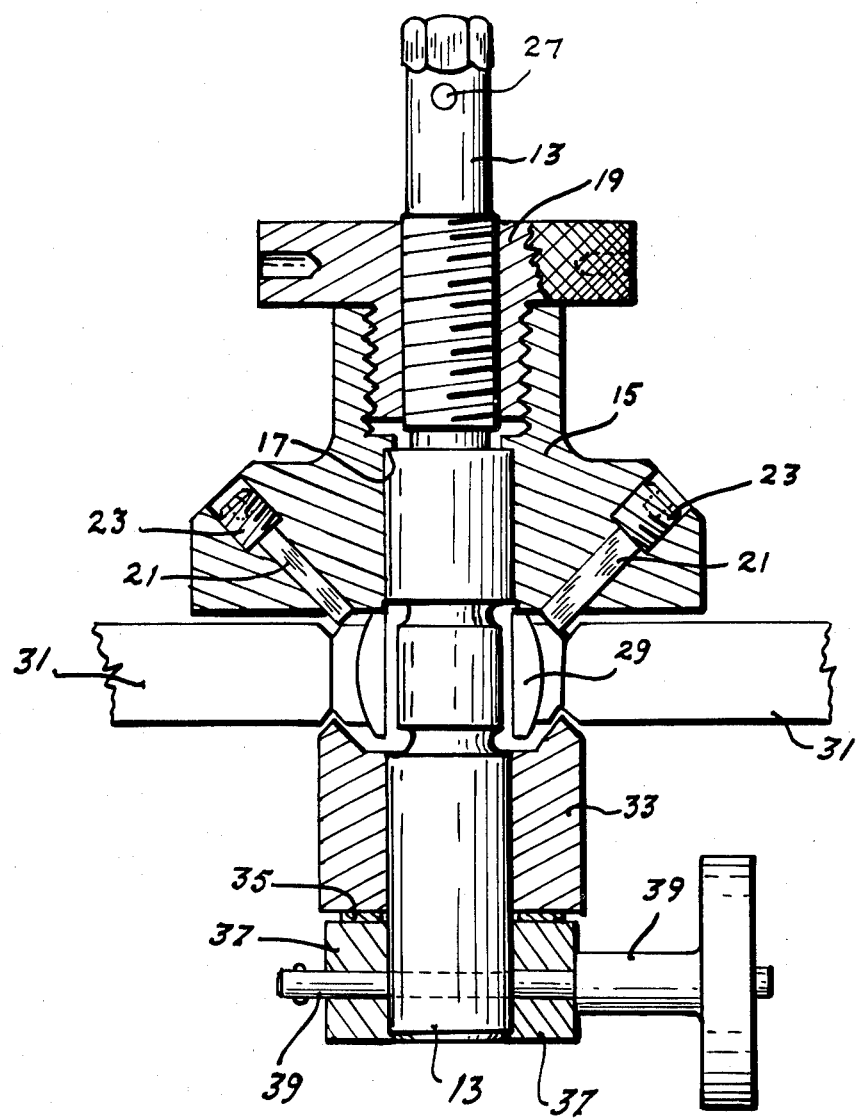

STAKED BEARING CUTTER

STATEMENT OF GOVERNMENT INTEREST

The invention described herein may be manufactured and used by or for the Government for governmental purposes without the payment of any royalty thereon.

BACKGROUND OF THE INVENTION

This invention relates to a hand tool for removing bearings that have been roller staked in an aircraft fitting and, more particularly, the invention is concerned with providing a rotary cutter having a plurality of cutter bits concentrically mounted about a central pin to remove a controlled amount of the staked metal which holds the bearing in position.

Heretofore, it has been the common practice to use a tool such as a hole saw for manually removing a staked bearing from an aircraft structure or the like. The hole saw must be specially configured in order to operate and, even then, the operation is not dependable. An unusual degree of skill and experience is required to perform the task with the special hole saw and damage to the aircraft structure frequency occurs. The difficulty arises because of the problems encountered while attempting to maintain the hole saw in a concentrically accurate condition. Any deviation will result in damage to the aircraft structure, bearing or tool, or all three. Thus, it can be seen that, presently, there is no satisfactory tool which is suitable for manually removing a 360° staked bearing from an aircraft structure without subjecting the aircraft structure to possible damage or without requiring an unusual degree of skill on the part of the user.

SUMMARY OF THE INVENTION

The present invention is concerned with providing a cutter for staked bearings which is capable of performing an accurate concentric cut at a controlled feed rate. The staked bearing cutter includes three equally spaced cutting blades which operate to stabilize the cutter assembly as well as performing small predicted precise cuts. The cutter assembly incorporates an integral timing and blade calibration component which also serves as a retention collar. The staked grooves on the bearing race are used for concentric positioning of the cutter assembly.

Accordingly, it is an object of the invention to provide a staked bearing cutter which is easily installable on an aircraft structure having a staked bearing attached thereto.

Another object of the invention is to provide a staked bearing cutter wherein the cutting depth and speed is completely controllable and only minimum effort is needed for maximum performance.

Still another object of the invention is to provide a manually operated staked bearing cutter which can be accurately aligned with the bearing thereby preventing damage to the adjacent aircraft structure.

A further object of the invention is to provide a manually operated staked bearing cutter having replaceable and adjustable cutter blades and which includes a positive drive system for feeding the cutters into the workpiece.

A still further object of the invention is to provide a staked bearing cutter having an integral calibration gauge. The cutter assembly can be quickly and easily removed from the workpiece after the material has been removed.

Another still further object of the invention is to provide a cutter which is suitable for relieving material on a 360° staked bearing for purposes of removing the bearing from an aircraft fitting. The design concept is adaptable to a wide range of sizes and is proven by actual performance.

These and other objects, features and advantages, will become more readily apparent after considering the following detailed description taken in conjunction with the annexed drawings and appended claims.

DESCRIPTION OF THE DRAWING

The drawing FIGURE is a view in longitudinal cross-section of a manually operated staked bearing cutter according to the invention showing the device in position on an aircraft structure ready to remove the staking material and thereby release the staked bearing.

DETAILED DESCRIPTION OF A PREFERRED EMBODIMENT

Referring now to the drawing FIGURE, there is illustrated a staked bearing cutter having a pin member 13 installed in a housing 15 against the shoulder 17. A threaded bushing 19 keeps the pin 13 in position against the shoulder 17 in the housing 15. A plurality of cutter bits 21 are inserted in holes in the housing 15 and held in position by the set screws 23. In practice, there are three cutter bits 21 equally spaced in the housing 15. The set screws 23 are adjusted until the cutter bits 21 extend beyond the housing 15 a predetermined distance and are then locked in position by other set screws (not shown).

The cutter assembly is assembled by first inserting the pin member 13 into the housing 15. The housing 15 is held in a particular position on the pin member 13. The threaded bushing 19 is then started onto the threads on the pin member 13 and turned downward until the outside thread engages the inside threads on the housing 15. The bushing 19 is rotated further until the flat thereon bottoms on the upper surface of the housing 15. Member 27 is put into position. The cutter assembly is now ready to be installed on the bearing 29 which is staked in the aircraft structure 31.

In order to operate the cutter to remove the staked bearing 29, the groove of the bearing to be cut is lubricated with an appropriate cutting oil mixture. The pin member 13 of the cutter assembly is inserted through the base of the bearing 29. An anvil 33 is slipped over the lower end of the pin member 13 and raised upward until the pointedly configurated section is nested in the bearing lower stake groove. A washer 35 and a collar 37 are then slipped over the lower end of the pin member 13. A quick release pin 39 passes through the collar 37 and pin member 13 and operates to maintain the cutter assembly on the aircraft structure 31. After making sure that the threaded bushing 19 has been rotated counter clockwise to remove all axial play and that the cutter bits 21 and anvil 33 are nested in the bearing stake grooves, the cutter assembly is ready to perform the required concentric cut.

The actual cutting of the staked bearing 29 is started by rotating member 13 clockwise one full revolution. Next the cutter bits 21 are advanced by slight rotation of the threaded bushing 19 in the counter clockwise direction. This procedure is continued until the shoulder on the housing 15 bottoms out on the race of the bearing 29. Further rotation of the threaded bushing 19 becomes difficult thereby indicating that the staked material has been effectively removed and the cutting is complete. The quick release pin 39 is then removed and the collar 37, washer 35 and anvil 33 are slipped off the pin member 13. The remainder of the cutter assembly is lifted away from the aircraft structure and the cut bearing is pushed out with any suitable tool at hand.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the shape and positioning of the various elements, and that the disclosed device would have use in many other industries which utilize and maintain 360° staked bearings without departing from the true spirit and scope of the appended claims.

Having thus set forth the nature of my invention, what I claim and desire to secure by Letters Patent of the United States is:

1. A staked bearing cutter for relieving material on a 360° staked bearing, said cutter comprising an elongated pin member having a plurality of shoulders thereon, a threaded section near the upper end of said pin member, a housing having an internal opening therethrough for receiving said pin member therein, a shoulder on said housing being engaged with a shoulder on said pin member, the upper portion of the internal opening in said housing being threaded, a bushing having a threaded internal opening therethrough for engagement with the threads on said pin member, the lower external surface of said bushing being threaded for engagement with the internal threads in said housing, means for maintaining the cutter in concentric relationship to said staked bearing and means for cutting away the staked material holding the bearing in place by rotating said pin member causing the gradual removal of the staked material around the bearing.

2. The staked bearing cutter defined in claim 1 wherein the means for maintaining the cutter in concentric relationship to the bearing includes an anvil having an internal bore, the lower portion of said pin member being positioned in said base, said anvil having an upwardly pointed section nested in the lower stake groove of the bearing.

3. The staked bearing cutter defined in claim 2 wherein the means for cutting away the staked material holding the bearing includes a plurality of cutting bits angularly disposed in said housing, the lower end of each of said cutter bits being disposed in the upper stake grooves of the bearing such that the rotation of said pin member produces corresponding rotation of said housing with said cutter bits disposed therein.

* * * * *